(12) United States Patent
Shakespeare

(10) Patent No.: US 8,728,276 B2
(45) Date of Patent: May 20, 2014

(54) APPARATUS AND METHOD FOR CONTROLLING CURLING POTENTIAL OF PAPER, PAPERBOARD, OR OTHER PRODUCT DURING MANUFACTURE

(75) Inventor: John F. Shakespeare, Hiltulanlahti (FI)

(73) Assignee: Honeywell International Inc., Morristown, NJ (US)

( * ) Notice: Subject to any disclaimer, the term of this patent is extended or adjusted under 35 U.S.C. 154(b) by 226 days.

(21) Appl. No.: 12/784,234

(22) Filed: May 20, 2010

(65) Prior Publication Data
US 2011/0284178 A1 Nov. 24, 2011

(51) Int. Cl.
*D21F 11/00* (2006.01)
*G05B 13/02* (2006.01)
*D21F 7/06* (2006.01)
*D21G 9/00* (2006.01)
*G05B 17/02* (2006.01)

(52) U.S. Cl.
CPC ............ *D21G 9/0027* (2013.01); *D21F 7/06* (2013.01); *G05B 17/02* (2013.01)
USPC ............ 162/198; 162/263; 162/252; 700/128

(58) Field of Classification Search
CPC ........ D21F 7/06; D21G 9/0027; G05B 17/00; G05B 17/02; G05B 13/02; Y10S 162/10; G01N 21/86; G01N 21/89
USPC .......................... 162/198, 252, 263, DIG. 10; 700/127–129, 2, 6, 30; 356/429; 250/559.01, 559.04–559.08, 250/559.11–559.13, 559.16–559.18
See application file for complete search history.

(56) References Cited

U.S. PATENT DOCUMENTS

| 3,385,754 A | * | 5/1968 | Burgess, Jr. | 162/299 |
| 3,807,868 A | * | 4/1974 | Simila | 356/369 |
| 3,902,961 A | * | 9/1975 | Roerig et al. | 162/216 |
| 4,455,197 A | * | 6/1984 | Croteau et al. | 162/343 |
| 4,505,779 A | * | 3/1985 | Boissevain | 162/199 |

(Continued)

FOREIGN PATENT DOCUMENTS

| WO | WO 9832916 A1 | * | 7/1998 |
| WO | WO 9958436 A1 | * | 11/1999 |

(Continued)

OTHER PUBLICATIONS

John Shakespeare, "Tutorial: Fibre Orientation Angle Profiles—Process Principles and Cross-Machine Control", TAPPI 1998 Process Control, Electrical & Information (Mar. 16-19, 1998, Vancouver BC), p. 593-636.

*Primary Examiner* — Jose Fortuna

(57) ABSTRACT

A method includes receiving a measurement associated with an anisotropy of a first surface and a measurement associated with an anisotropy of a second surface of a sheet of material. The method also includes adjusting an operating parameter associated with a headbox based on the measurements. The headbox is associated with manufacture of the sheet. The operating parameter could include a jet speed, a jet impingement angle, a jet thickness, a slice opening, and/or a slice apron projection. Adjusting the operating parameter could be based on a difference between a measured anisotropy of the first surface and a measured anisotropy of the second surface. For example, the operating parameter could be adjusted to achieve a desired difference between the measured anisotropy of the first surface and the measured anisotropy of the second surface. Multiple headboxes could be controlled, such as when different headboxes are used to produce different layers of a multi-layer sheet.

16 Claims, 3 Drawing Sheets

(56) References Cited

U.S. PATENT DOCUMENTS

| | | | | |
|---|---|---|---|---|
| 4,654,529 | A | * | 3/1987 | Boulay et al. ............. 250/341.3 |
| 4,710,700 | A | * | 12/1987 | Osaki et al. ................... 324/631 |
| 4,955,720 | A | * | 9/1990 | Blecha et al. ................. 356/429 |
| 5,025,665 | A | * | 6/1991 | Keyes et al. .................... 73/597 |
| 5,133,836 | A | * | 7/1992 | Allen ............................ 162/343 |
| 5,394,247 | A | * | 2/1995 | Vahey et al. ................. 356/429 |
| 5,640,244 | A | * | 6/1997 | Hellstrom et al. ............ 356/429 |
| 5,827,399 | A | * | 10/1998 | Neittaanmaki et al. ....... 162/198 |
| 5,898,589 | A | * | 4/1999 | Shakespeare et al. ......... 700/129 |
| 7,164,145 | B2 | * | 1/2007 | Shakespeare ............ 250/559.09 |
| 7,399,380 | B2 | * | 7/2008 | Ferm et al. .................... 162/198 |
| 7,545,971 | B2 | * | 6/2009 | Shakespeare ................. 382/141 |
| 7,695,592 | B2 | * | 4/2010 | Shakespeare et al. ......... 162/198 |
| 8,214,071 | B2 | * | 7/2012 | Sasaki et al. .................. 700/127 |
| 2003/0144747 | A1 | * | 7/2003 | Shakespeare ................... 700/28 |
| 2003/0156293 | A1 | * | 8/2003 | Kazuhiko et al. .............. 356/446 |
| 2006/0096727 | A1 | * | 5/2006 | Ferm et al. ..................... 162/198 |
| 2006/0237156 | A1 | * | 10/2006 | Shakespeare et al. ......... 162/198 |
| 2006/0255300 | A1 | * | 11/2006 | Shakespeare ............ 250/559.37 |
| 2009/0184463 | A1 | * | 7/2009 | Shakespeare et al. ... 271/265.01 |
| 2010/0228518 | A1 | * | 9/2010 | Shakespeare et al. ......... 702/155 |
| 2010/0276099 | A1 | * | 11/2010 | Sasaki et al. ................... 162/252 |
| 2011/0284178 | A1 | * | 11/2011 | Shakespeare ................. 162/198 |
| 2011/0295390 | A1 | * | 12/2011 | Chu et al. ......................... 700/30 |
| 2013/0055912 | A1 | * | 3/2013 | Beselt et al. ................... 101/147 |
| 2013/0098172 | A1 | * | 4/2013 | Shakespeare ............... 73/863.92 |

FOREIGN PATENT DOCUMENTS

| | | |
|---|---|---|
| WO | WO 2006115553 A1 * | 11/2006 |
| WO | WO 2011146257 A2 * | 11/2011 |
| WO | WO 2011146257 A3 * | 4/2012 |

* cited by examiner

APPARATUS AND METHOD FOR CONTROLLING CURLING POTENTIAL OF PAPER, PAPERBOARD, OR OTHER PRODUCT DURING MANUFACTURE

TECHNICAL FIELD

This disclosure relates generally to web manufacturing and more specifically to an apparatus and method for controlling the curling potential of paper, paperboard, or other products during manufacture.

BACKGROUND

Sheets of material are often used in a variety of industries and in a variety of ways. These materials can include paper, multi-layer paperboard, and other products manufactured or processed in webs or sheets. As a particular example, long sheets of paper or other materials can be manufactured and collected in reels. These types of products are often subject to various out-of-plane deformations like curl.

Curl of a product is often undesirable. Curling may cause jams in printing or copying devices if the curling occurs when a paper sheet is moistened (such as by inkjet ink) or heated (such as in toner-based printers). Processes that convert paperboard to corrugated cardboard may fail due to incomplete adhesion between fluting and liners when curling occurs. Cartons made from curled board typically have diminished strength. Curl in folding boxboards and packaging for liquids may be desirable, such as when limited curl allows easier insertion and withdrawal of items to and from a package. However, this curl may be desirable only if the axis of curl is suitable and the degree of curl is within limits. The actual amount of curl can typically be measured only in a laboratory.

SUMMARY

This disclosure provides an apparatus and method for controlling the curling potential of paper, paperboard, or other products during manufacture.

In a first embodiment, a method includes receiving a measurement associated with an anisotropy of a first surface and a measurement associated with an anisotropy of a second surface of a sheet of material. The method also includes adjusting an operating parameter associated with a headbox based on the measurements. The headbox is associated with manufacture of the sheet.

In a second embodiment, an apparatus includes an interface configured to receive a measurement associated with an anisotropy of a first surface and a measurement associated with an anisotropy of a second surface of a sheet of material. The apparatus also includes a processing unit configured to adjust an operating parameter associated with a headbox based on the measurements. The headbox is associated with manufacture of the sheet.

In a third embodiment, a computer readable medium embodies a computer program. The computer program includes computer readable program code for receiving a measurement associated with an anisotropy of a first surface and a measurement associated with an anisotropy of a second surface of a sheet of material. The computer program also includes computer readable program code for adjusting an operating parameter associated with a headbox based on the measurements anisotropies. The headbox is associated with manufacture of the sheet.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1A:
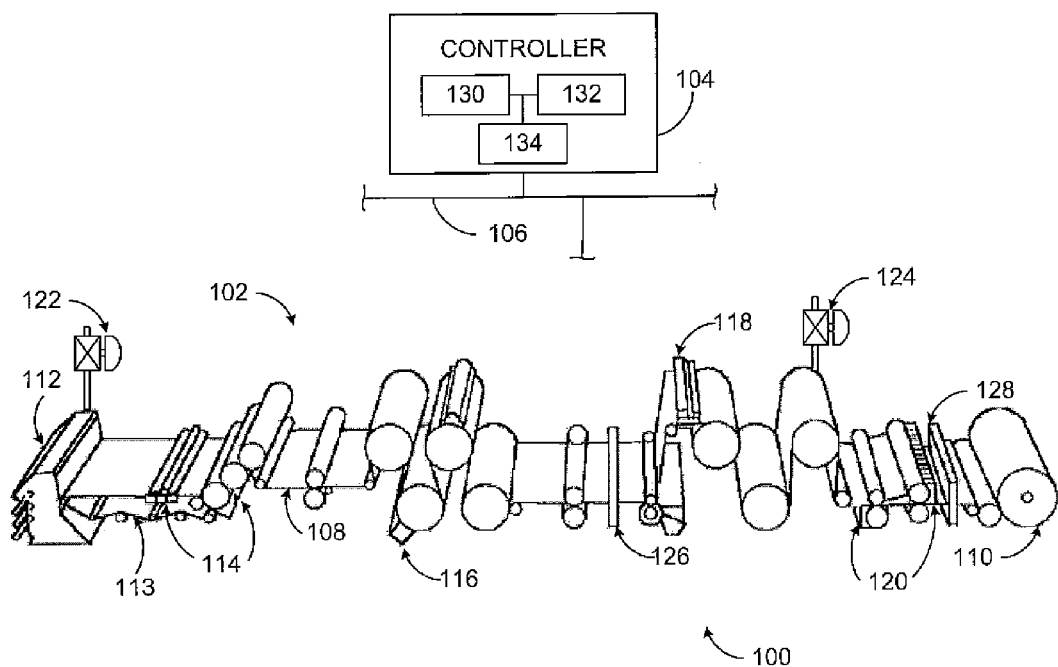
FIG. 1A illustrates an example sheet production system according to this disclosure.

FIG. 1A illustrates an example sheet production system 100 according to this disclosure. In this example, the system 100 includes a paper machine 102, a controller 104, and a network 106. The paper machine 102 includes various components used to produce a paper product, namely a paper sheet 108 collected at a reel 110. The controller 104 monitors and controls the operation of the paper machine 102, which may help to maintain or increase the quality of the paper sheet 108 produced by the paper machine 102.

In this example, the paper machine 102 includes at least one headbox 112, which distributes a pulp suspension uniformly across the machine onto a continuous moving wire screen or mesh 113. The pulp suspension entering the headbox 112 may contain, for example, 0.2-3% wood fibers, fillers, and/or other materials, with the remainder of the suspension being water. The headbox 112 may include an array of dilution actuators, which distributes dilution water into the pulp suspension across the sheet. The dilution water may be used to help ensure that the resulting paper sheet 108 has a more uniform basis weight across the sheet 108.

Figure 1B:
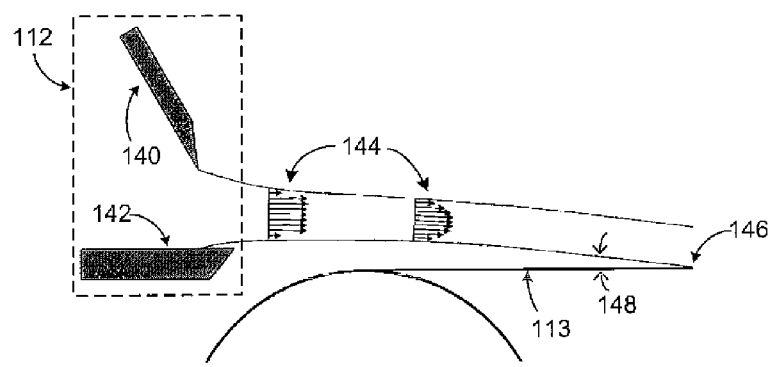
FIG. 1B illustrates a more detailed view of part of an example sheet production system according to this disclosure.

FIG. 1B illustrates a more detailed view of part of an example sheet production system, such as system 100, according to this disclosure. In this example, the headbox 112 includes an array of slice lip actuators 140, which controls a slice opening across the machine from which the pulp suspension exits the headbox 112 onto the moving wire screen or mesh 113. The array of slice lip actuators 140 may also be used to control the basis weight of the paper or the distribution of fiber orientation angles of the paper across the sheet.

The headbox 112 may additionally be equipped with a moveable slice apron 142 (sometimes called a lower lip). Changing the amount of projection of the slice apron 142 in front of the plane of the slice lip actuators 140 changes the angle of the jet leaving the slice and thus affects the point of impingement 146 and angle of impingement 148 of the jet in the forming zone of the moving wire screen or mesh 113, and consequently influences numerous characteristics of the formed sheet.

The speed with which the jet is discharged from the headbox 112 is controlled by regulating the hydraulic pressure of the pulp suspension within the headbox 112 or the pneumatic pressure of an air pad in contact with the pulp suspension inside the headbox 112. The jet speed (indicated with arrows at 144) is commonly controlled to be a specified nominal ratio of the speed of the moving wire or mesh 113 or to have a specified nominal difference in speed with respect to the wire or mesh 113. The actual jet speed may not be generally known with great accuracy.

Returning now to FIG. 1A, arrays of drainage elements 114, such as vacuum boxes, remove as much water as possible. An array of steam actuators 116 produces hot steam that penetrates the paper sheet 108 and releases the latent heat of the steam into the paper sheet 108, thereby increasing the temperature of the paper sheet 108 in sections across the sheet. The increase in temperature may allow for easier removal of remaining water from the paper sheet 108. An array of rewet shower actuators 118 adds small droplets of water (which may be air atomized) onto the surface of the paper sheet 108. The array of rewet shower actuators 118 may be used to control the moisture profile of the paper sheet 108, reduce or prevent over-drying of the paper sheet 108, or correct any dry streaks in the paper sheet 108.

The paper sheet 108 is then often passed through a calender having several nips of counter-rotating rolls. Arrays of induction heating actuators 120 heat the shell surfaces of various ones of these rolls. As each roll surface locally heats up, the roll diameter is locally expanded and hence increases nip pressure, which in turn locally compresses the paper sheet 108. The arrays of induction heating actuators 120 may therefore be used to control the caliper (thickness) profile of the paper sheet 108. The nips of a calender may also be equipped with other actuator arrays, such as arrays of air showers or steam showers, which may be used to control the gloss profile or smoothness profile of the paper sheet.

Two additional actuators 122-124 are shown in FIG. 1A. A thick stock flow actuator 122 controls the consistency of the incoming stock received at the headbox 112. A steam flow actuator 124 controls the amount of heat transferred to the paper sheet 108 from drying cylinders. The actuators 122-124 could, for example, represent valves controlling the flow of stock and steam, respectively. These actuators may be used for controlling the dry weight and moisture of the paper sheet 108.

Additional components could be used to further process the paper sheet 108, such as a supercalender (for improving the paper sheet's thickness, smoothness, and gloss) or one or more coating stations (each applying a layer of coatant to a surface of the paper to improve the smoothness and printability of the paper sheet). Similarly, additional flow actuators may be used to control the proportions of different types of pulp and filler material in the thick stock and to control the amounts of various additives (such as retention aid or dyes) that are mixed into the stock.

This represents a brief description of one type of paper machine 102 that may be used to produce a paper product. Additional details regarding this type of paper machine 102 are well-known in the art and are not needed for an understanding of this disclosure. Also, this represents one specific type of paper machine 102 that may be used in the system 100. Other machines or devices could be used that include any other or additional components for producing a paper product. In addition, this disclosure is not limited to use with systems for producing paper products and could be used with systems that process the produced paper or with systems that produce or process other items or materials, such as multi-layer paperboard, cardboard, plastic, textiles, metal foil or sheets, or other or additional materials that are manufactured or processed as moving sheets.

In order to control the paper-making process, one or more properties of the paper sheet 108 may be continuously or repeatedly measured. The sheet properties can be measured at one or various stages in the manufacturing process. This information may then be used to adjust the paper machine 102, such as by adjusting various actuators within the paper machine 102. This may help to compensate for any variations of the sheet properties from desired targets, which may help to ensure the quality of the sheet 108.

As shown in FIG. 1A, the paper machine 102 includes one or more scanners 126-128, each of which may include one or more sensors. Each scanner 126-128 is capable of scanning the paper sheet 108 and measuring one or more characteristics of the paper sheet 108. For example, each scanner 126-128 could include sensors for measuring the anisotropy, color, gloss, sheen, haze, surface features (such as roughness, topography, or orientation distributions of surface features), or any other or additional characteristics of the paper sheet 108.

Each scanner 126-128 includes any suitable structure or structures for measuring or detecting one or more characteristics of the paper sheet 108, such as sets or arrays of sensors. A scanning or moving set of sensors represents one particular embodiment for measuring sheet properties. Other embodiments could be used, such as those using stationary sets or arrays of sensors, deployed in one or a few locations across the sheet or deployed in a plurality of locations across the whole width of the sheet such that substantially the entire sheet width is measured.

The controller 104 receives measurement data from the scanners 126-128 and uses the data to control the paper machine 102. For example, the controller 104 may use the measurement data to control potential curl of the sheet 108 as described in greater detail below. The controller 104 includes any hardware, software, firmware, or combination thereof for controlling the operation of at least part of the paper machine 102. In this example, the controller 104 includes at least one processing unit 130, such as a microprocessor, microcontroller, digital signal processor, field programmable gate array, or application-specific integrated circuit. The controller 104 also includes at least one memory 132 storing instructions and data used, generated, or collected by the processing units and at least one network interface 134 for receiving measurements from the scanners 126-128.

The network 106 is coupled to the controller 104 and various components of the paper machine 102 (such as the actuators and scanners). The network 106 facilitates communication between components of system 100. The network 106 represents any suitable network or combination of networks facilitating communication between components in the system 100. The network 106 could, for example, represent a wired or wireless Ethernet network, an electrical signal network (such as a HART or FOUNDATION FIELDBUS network), a pneumatic control signal network, or any other or additional network(s).

A principal cause of curl is often a difference in anisotropy between top and bottom surfaces of the sheet 108. Anisotropy is a measurement of the alignment of the fibers or other components in the sheet. In a sheet exhibiting high anisotropy, the fibers tend to be aligned in the same direction. While the amount of curl can typically be measured in a laboratory, anisotropy can be measured on-line during manufacture of the sheet 108. As described in more detail below, one or more scanners 126-128 can include sensors for measuring the anisotropy of the top and bottom surfaces of the sheet 108. The controller 104 could implement control logic for adjusting the operation of the headbox 112 based on the measured anisotropies in order to control the potential curl of the sheet 108.

Although FIGS. 1A and 1B illustrate examples of a sheet production system 100, various changes may be made to FIGS. 1A and 1B. For example, other systems could be used to produce paper products or other products. Also, while shown as including a single paper machine 102 with various components and a single controller 104, the production system 100 could include any number of paper machines or other production machinery having any suitable structure, and the system 100 could include any number of controllers. In addition, FIGS. 1A and 1B illustrate operational environments in which potential curl of a sheet can be controlled. This functionality could be used in any other suitable system.

Figure 2A:
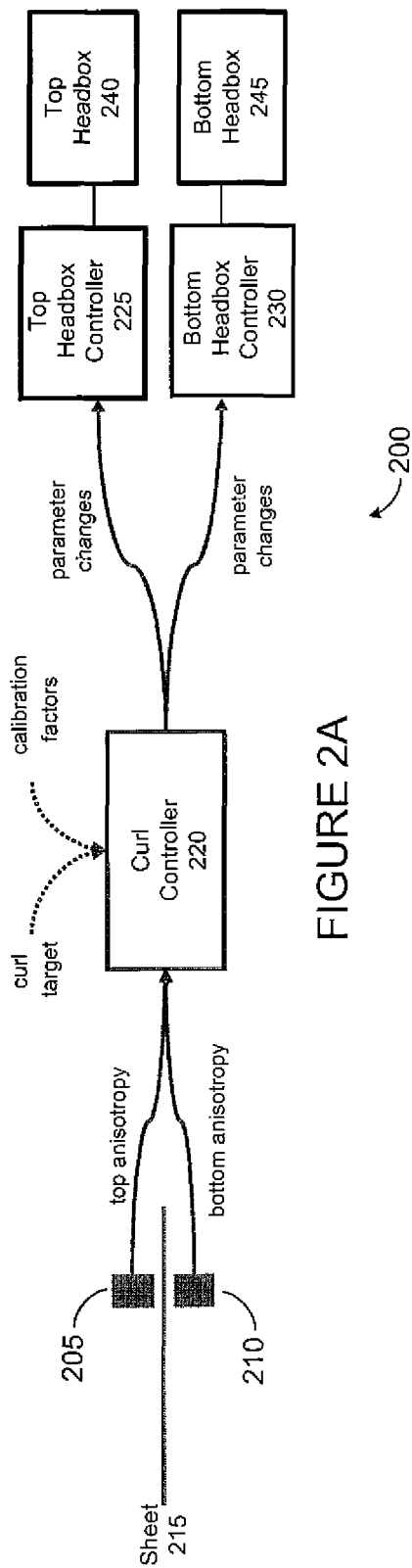
FIGS. 2A and 2B illustrate example curl control systems according to this disclosure.
Figure 2B:
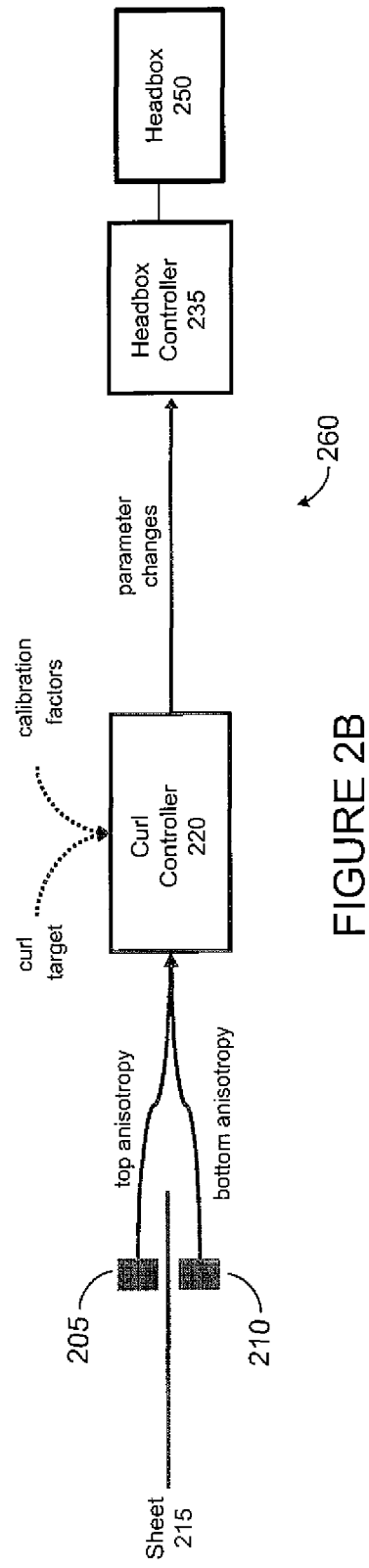

FIGS. 2A and 2B illustrate example curl control systems 200 and 260 according to this disclosure. Using a paper sheet as an example, the geometry of paper is often sensitive to humidity changes because of the paper's composition. For example, paper fibers can expand when moistened and contract when dried. In many cases, the expansion and contraction occur in the thickness of the fiber much more than in the length of the fiber. For a given change in humidity, the geometric change of a paper sheet increases with the anisotropy of the sheet. A difference in anisotropy between surfaces of a paper sheet may cause curl when the humidity changes. If the orientation angles of the fibers are similar on both surfaces, the curl axis is across the direction of orientation, and twist is usually non-existent or negligible. Conversely, if the orientation angles of the fibers between the surfaces differ significantly, the curl axis is largely from the surface with the higher anisotropy, and twist is more significant. The amount of twist is often determined by the lower of the anisotropies, while the twist axis is often determined by an average of the orientation directions.

Anisotropy can be determined in the forming section of the paper production process (such as that shown in FIG. 1A). The difference between the jet speed (the speed of material exiting the headbox 112) and the wire speed (the speed of the wire screen or mesh 113) is a major factor in determining anisotropy. Large differences generally result in higher anisotropies. The jet impingement angle is a secondary factor. For example, high impingement angles may reduce the difference in anisotropies between surfaces of a sheet. The influence of the impingement angle 148 on the difference in anisotropy between surfaces of a single layer is also dependent on the thickness of the jet.

Using a multi-layer paperboard as another example, the layers of a multi-layer board are often formed independently with a separate headbox and forming zone for each layer. In certain production processes known as multi-former production, the layers are spliced together where multiple wire screens or meshes 113 overlap. In other production processes known as single former production, the layers are applied sequentially on a single wire or mesh 113. Even though the wire speeds may be identical in each forming unit, the jet speeds in each headbox 112 are often independent and may differ between headboxes 112. Thus, the anisotropies can be independent in each forming unit and may differ.

Anisotropy is often measured in the laboratory, usually by means of ultrasound propagation. Ultrasound propagation is not a surface measurement. Rather, it measures an average anisotropy over the whole thickness of a sheet. Because of this, ultrasound propagation cannot be used to measure differences between surfaces. Moreover, for analysis of a multi-layer structure, ultrasound propagation typically requires the splitting of the structure into individual layers. Splitting a multi-layer sheet into its component layers is a laborious and time-consuming operation. As a result, the measurement is generally not available until some hours or even days after the sheet was produced. Moreover, splitting into layers is also difficult to achieve without some parts of each layer either having material from another layer adhering to them or being depleted through loss of material to another layer in the splitting operation.

Likewise, twist and curl are often measured in the laboratory by examining geometric deformation under humidity variations. Typically, a sheet is cut into numerous small samples, and each sample's deformation is observed at low and high humidities. The amount of time required for the humidification to reach equilibrium results in long lags between measurements.

It is clear here that laboratory measurements of anisotropy, twist, and curl are neither timely nor representative. The measurements often require analysis of a sample taken from a reel after production. In most cases, no more than a few measurements are obtained to characterize a whole reel. These sparse measurements cannot describe the variability in anisotropy, twist, or curl over short times.

It is possible to measure anisotropy in real time during the production process. For example, the FOTOFIBER gauge from HONEYWELL INTERNATIONAL INC. measures both surface anisotropy and surface fiber orientation independently on both surfaces of a sheet. The measurements are taken continuously during production. The FOTOFIBER gauge is described in greater detail in U.S. Pat. No. 7,695,592, which is incorporated by reference.

Other devices capable of producing measurements of anisotropy (or proxies of anisotropy) may also be used. For example, a proxy of anisotropy may be the ratio or difference between a directional property of paper in the machine direction and the same directional property measured in the cross-machine direction. Directional properties include but are not limited to mechanical properties (such as tensile strength or speed of propagation of sonic or mechanical impulses) and optical properties (such as gloss or brightness).

In accordance with this disclosure, anisotropy measurements may serve as an estimate or proxy of curl potential. As a result, an estimate or proxy for curl potential can be determined from on-line surface measurements taken during production of an uncurled sheet. A suitable estimate can be provided, for instance, by measuring the anisotropy on both surfaces of the paper or board during production. In some embodiments, the curl potential is equal to the difference in anisotropy values between the surfaces of the sheet. In other embodiments, the curl potential could be calculated as the difference in squares (or other power or nonlinear scaling operation) of the anisotropy values. These curl potential values provide an indication of the potential for curl occurring when the sheet is later wetted or dried. In still other embodiments, the sum of the surface anisotropies can be used to refine the estimate of curl potential.

Moreover, the curl axis is generally equal to the orientation angle of the surface with higher anisotropy. This estimate may be suitable if the fibers are similar or identical on both surfaces. However, many sheets are finished differently on different surfaces and therefore have different fibers on each surface. In such a case, different calculations may be used.

The above technique may be initialized or improved using one-time or intermittent calibrations using laboratory measurements. For example, the laboratory measurements may establish an ideal anisotropy difference for each type of paper that is being produced.

With this in mind, FIG. 2A illustrates an example curl control system 200, which is configured for use in production of multi-layer sheets such as paperboard. FIG. 2B illustrates an example curl control system 260, which is configured for use in production of single-layer sheets such as paper. Both curl control systems 200, 260 include anisotropy gauges 205-210 and a curl controller 220. The anisotropy gauges 205-210 measure the anisotropy of a sheet 215. The anisotropy gauges 205-210 could, for instance, represent a FOTOFIBER gauge.

In FIG. 2A, the curl control system 200 includes a top headbox controller 225 that controls a top headbox 240 and a bottom headbox controller 230 that controls a bottom headbox 245. The top headbox 240 is configured to produce the top layer of a multi-layer sheet, and the bottom headbox 245 is configured to produce the bottom layer of the multi-layer sheet. Any additional headboxes configured to produce intermediate layers of the multi-layer sheet 215 are not depicted since the anisotropy of the intermediate layers is typically not readily measurable. In FIG. 2B, the curl control system 260 includes a single headbox controller 235 that controls a single headbox 250.

Each curl control system 200, 260 is configured to control the curl potential of its sheet 215 by manipulating at least one property of its associated headbox(es) 240-250 from which the sheet 215 is formed. For example, in FIG. 2A, the curl control system 200 uses online measurements from the anisotropy gauges 205-210 to identify which properties of the headboxes 240-245 to change and by how much. Similarly, in FIG. 2B, the curl control system 260 use online measurements from the anisotropy gauges 205-210 to identify which properties of the headbox 250 to change and by how much. In some embodiments, one or more properties of the headbox(es) 240-250 are changed to minimize the differences in anisotropy between the two surfaces of the sheet 215 or to otherwise achieve a desired difference in anisotropies.

In one aspect of operation, the anisotropy gauges 205-210 measure the anisotropies of surfaces of the sheet 215, such as when it moves down the wire or mesh 113. For instance, the anisotropy gauge 205 can measure the anisotropy of the top surface of the sheet 215, and the anisotropy gauge 210 can measure the anisotropy of the bottom surface of the sheet 215. The top and bottom surfaces could be associated with different layers of material (FIG. 2A) or the same layer of material (FIG. 2B). The anisotropy gauges 205-210 can take measurements on an intermittent or continual basis. In some embodiments, the anisotropy gauges 205-210 may be configured to obtain a complete set of measurements once or twice per minute. As the anisotropy measurements are obtained, they are transmitted to the curl controller 220.

The curl controller 220 receives the anisotropy measurements of the surfaces of the sheet 215. The curl controller 220 can determine whether the measured anisotropies are at or near target values. The curl controller 220 can also determine one or more estimates of curl potential using the measurements (such as the difference between measurements) and determine whether the potential curl estimates are at or near a target value. For example, many types of paper are expected to exhibit no curl at all, so these types of sheets have a curl target value of zero. Other types of sheets (such as folding boxboard used in some types of packaging) are produced to exhibit a small amount of curl. These types of sheets have a non-zero curl target value. If necessary, the curl controller 220 can make alterations to the production process.

The curl controller 220 may also consider one or more calibration factors when determining whether the anisotropy measurements or estimated curl potential is acceptable. The calibration factors may be associated with the type of sheet 215 being produced. For example, in a multi-layer sheet, the top and bottom layers may be composed of different grades of stock or have different filler material or different chemical additives (such as for enhancing wet strength or fiber flocculation). Thus, each layer may have a different anisotropy target. Calibration factors may be used to account for these differences. Likewise, calibration factors may be related to differences in the make, model, or operating parameters of the production equipment, such as one or more headboxes 240-250.

Based on the obtained anisotropy measurements or estimated curl potential, the target value(s), and any calibration factors, the curl controller 220 can determine one or more parameters to change in one or more of the headboxes 240-250. The parameters may be determined, for example, using an algorithm or by cross reference to a data table. Once the curl controller 220 determines what parameters to change, the curl controller 220 sends control signals to the headbox controllers 225-235, and the headbox controllers adjust the parameters of the headboxes 240-250 according to the control signals from the controller 220.

As examples, the curl controller 220 in FIG. 2A can send control signals to one or both of the headbox controllers 225-230. Based on the control signals, the top headbox controller 225 can adjust zero, one, or more parameters of the top headbox 240. Likewise, the bottom headbox controller 230 can adjust zero, one, or more parameters of the bottom headbox 245. The curl controller 220 in FIG. 2B can send control signals the headbox controller 235. Based on the control signals, the headbox controller 235 can adjust zero, one, or more parameters of the headbox 250.

The parameters that may be manipulated to change one or more surface anisotropies to one or more desired values can include any suitable parameters. For example, in the production of a multi-layer sheet such as shown in FIG. 2A, it is possible to change the anisotropies of the top layer and bottom layer independently by modifying the headbox pressure (and hence the jet speed) in the headboxes 240-245. Changes to jet thicknesses and impingement angles in the headboxes 240-245 may also be employed, if necessary. The manipulation of the jet thickness and jet impingement angle can be achieved using a number of techniques. One technique is to change the total slice opening of the headbox 240-245. A change in the total slice opening affects jet thickness, impingement angle, jet consistency, and forming section drainage. Another technique is to change the slice apron projection. A change to the slice apron projection affects the impingement angle and the formation characteristics of the sheet.

Thus, as shown in FIG. 2A, control signals from the curl controller 220 to the top headbox controller 225 may request changes to parameters such as jet speed, jet thickness, impingement angle, slice opening, slice apron projection, or any other suitable parameter(s) of the top headbox 240. The control signals may also indicate how much to change each parameter or indicate what the new parameter value should be. Likewise, control signals from the curl controller 220 to the bottom headbox controller 230 may request changes to parameters such as jet speed, jet thickness, impingement angle, slice opening, slice apron projection, or any other suitable parameter(s) of the bottom headbox 245. By manipulating the parameters of one or both headboxes 240-245, it is possible to minimize the anisotropy difference between the surfaces or achieve a desired anisotropy difference between the layers. In some embodiments, it may be desirable to maintain the anisotropy level in a layer or an average anisotropy across multiple layers at a specified level.

Similarly, in production of a single layer sheet such as shown in FIG. 2B, it is possible to change the anisotropy of the sheet and/or obtain a specified difference in anisotropies between its top and bottom surfaces by manipulating parameters such as the jet thickness and jet impingement angle in the headbox 250. Changes to the jet speed in the headbox 250 may also be employed if necessary.

Thus, as shown in FIG. 2B, control signals from the curl controller 220 to the headbox controller 235 may request changes to parameters such as jet speed, jet thickness, impingement angle, slice opening, slice apron projection, and any other suitable parameter(s) of the headbox 250. The control signals may also indicate how much to change each parameter or indicate what the new parameter value should be.

In some embodiments, the curl control system 200, 260 may be incorporated into or added onto the paper production system 100 of FIG. 1A. As a particular example, the anisotropy gauges 205-210 may replace, augment, or be incorporated into one or more of the scanners 126-128. As another example, the curl controller 220 may replace, augment, or be incorporated into the controller 104.

Although FIGS. 2A and 2B illustrate examples of curl control systems 200 and 260, various changes may be made to FIGS. 2A and 2B. For example, additional anisotropy gauges could be used to measure different surfaces or parts of surfaces of the sheet 215. Also, the curl controller 220 could receive and process additional inputs in order to determine which parameters of the headboxes 240-250 to change. In addition, although the curl controller 220 is depicted in FIGS. 2A and 2B as separate from the headbox controllers 225-235, the curl and headbox controllers could be integrated into a single controller.

Figure 3:
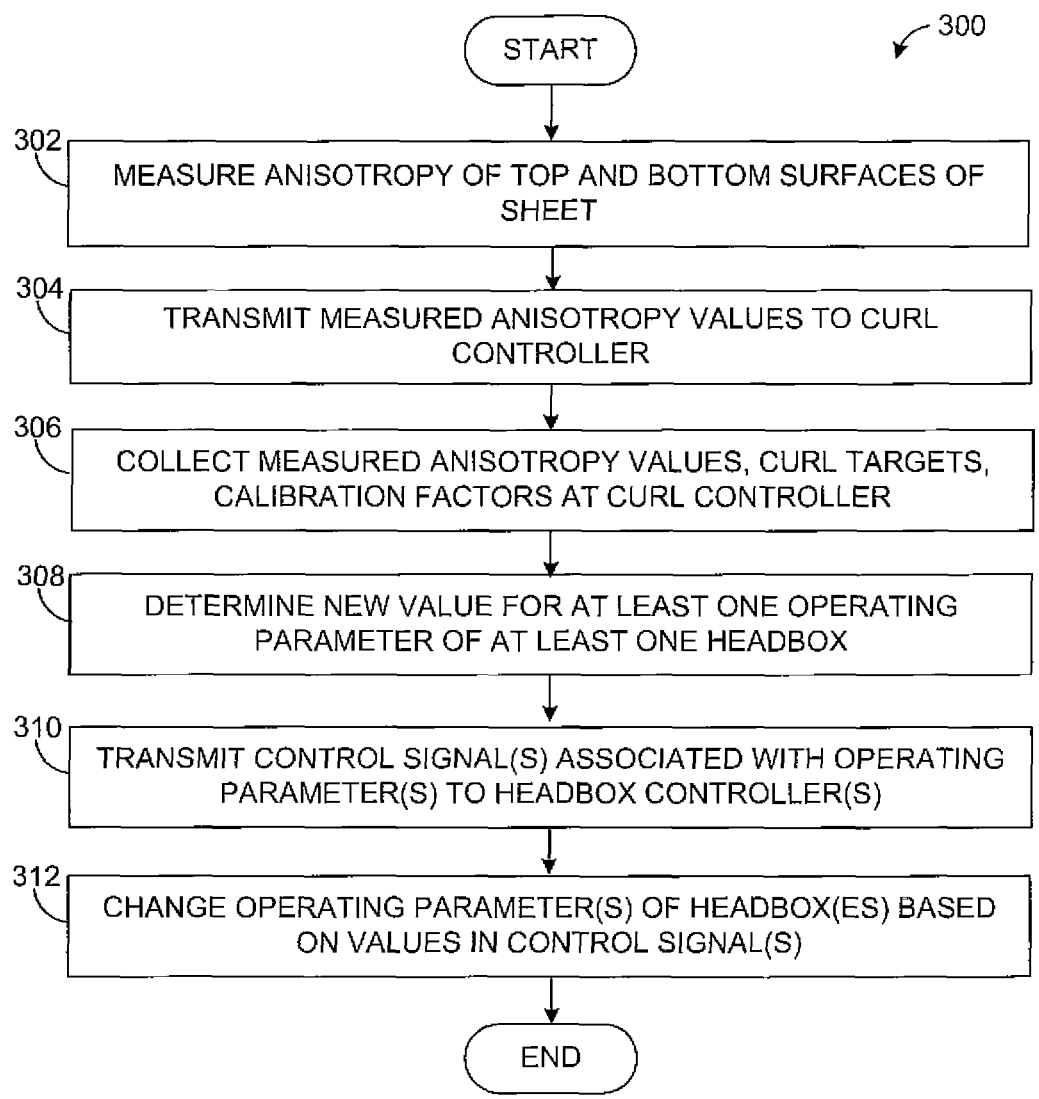
FIG. 3 illustrates an example method for controlling the curling potential of a sheet product according to this disclosure.

FIG. 3 illustrates an example method 300 for controlling the curling potential of a sheet product according to this disclosure. One or more anisotropy gauges measure an anisotropy of a top surface and a bottom surface of a sheet product at step 302. The measured anisotropies are transmitted to a curl controller at step 304. The curl controller collects the measured anisotropies along with one or more curl targets and/or one or more calibration factors at step 306.

Based on the measured anisotropies, the one or more curl targets, and/or the one or more calibration factors, the curl controller determines a new value of at least one operating parameter for one or more headboxes at step 308. The new parameter value(s) can be chosen to provide a desired anisotropy in one or more surfaces of the sheet. The curl controller transmits control signals to one or more headbox controllers at step 310. The control signals instruct or request each headbox controller to update the operating parameter(s) in the headbox(es) to the new value(s). Using the control signals, each headbox controller can change one or more operating parameters in the associated headbox at step 312.

Although FIG. 3 illustrates one example of a method 300 for controlling the curling potential of a sheet product, various changes may be made to FIG. 3. For example, while shown as a series of steps, various steps in FIG. 3 may overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving, via an interface, a measurement of an anisotropy of a first surface and a measurement of an anisotropy of a second surface of a sheet of material;
determining, using a processing unit, whether a curling potential of the sheet being manufactured is within target values for curl based on a difference between the measured anisotropy of the first surface and the measured anisotropy of the second surface; and
in response to determining that the curling potential of sheet being manufactured is outside the target values for curl, adjusting, using the processing unit, at least one operating parameter associated with a headbox based on the difference, the headbox associated with manufacture of the sheet;
wherein adjusting the at least one operating parameter comprises adjusting a projection of a slice apron in the headbox to thereby alter a point of impingement and an angle of impingement associated with a jet of material in the headbox.

2. The method of claim 1, wherein adjusting the at least one operating parameter further comprises adjusting at least one of: a jet speed, a jet thickness, and a slice opening.

3. The method of claim 1, wherein adjusting the at least one operating parameter comprises controlling the point of impingement and the angle of impingement associated with the jet of material onto a forming zone of a moving screen based on the difference between the measured anisotropy of the first surface and the measured anisotropy of the second surface.

4. The method of claim 3, wherein adjusting the at least one operating parameter comprises adjusting the at least one operating parameter to achieve a desired difference between the measured anisotropy of the first surface and the measured anisotropy of the second surface.

5. The method of claim 1, further comprising:
identifying a calibration factor associated with at least one of: the sheet and production equipment associated with the manufacture of the sheet;
wherein adjusting the at least one operating parameter comprises adjusting the at least one operating parameter based on the calibration factor.

6. The method of claim 1, wherein adjusting the at least one operating parameter comprises outputting a control signal to a headbox controller that controls the headbox.

7. The method of claim 1, wherein:
the sheet comprises a multi-layer sheet;
the headbox comprises a first headbox associated with a first layer of the multi-layer sheet and a second headbox associated with a second layer of the multi-layer sheet; and
the at least one operating parameter further comprises at least one of:
a jet speed of the first headbox; and
a jet speed of the second headbox.

8. The method of claim 1, wherein:
the sheet comprises a single layer sheet; and
the at least one parameter further comprises a slice opening of the headbox.

9. An apparatus comprising:
an interface configured to receive a measurement of an anisotropy of a first surface and a measurement of an anisotropy of a second surface of a sheet of material; and
a processing unit configured to:
determine whether a curling potential of the sheet being manufactured is within target values for curl based on a difference between the measured anisotropy of the first surface and the measured anisotropy of the second surface; and
adjust, in response to a determination that the curling potential of the sheet being manufactured is outside the target values for curl, at least one operating parameter associated with a headbox based on the difference, the headbox associated with manufacture of the sheet;
wherein the processing unit is configured to adjust the at least one operating parameter by adjusting a projection of a slice apron in the headbox to thereby alter a point of impingement and an angle of impingement associated with a jet of material in the headbox.

10. The apparatus of claim 9, wherein the at least one operating parameter further comprises at least one of: a jet speed, a jet thickness, and a slice opening.

11. The apparatus of claim 9, wherein the processing unit is configured to control the point of impingement and the angle of impingement associated with the jet of material onto a forming zone of a moving screen based on the difference between the measured anisotropy of the first surface and the measured anisotropy of the second surface.

12. The apparatus of claim 11, wherein the processing unit is configured to adjust the at least one operating parameter to achieve a desired difference between the measured anisotropy of the first surface and the measured anisotropy of the second surface.

13. The apparatus of claim 9, wherein:
the processing unit is further configured to identify a calibration factor associated with at least one of: the sheet and production equipment associated with the manufacture of the sheet; and
the processing unit is configured to adjust the at least one operating parameter based on the calibration factor.

14. The apparatus of claim 9, wherein the processing unit is configured to adjust the at least one operating parameter by outputting a control signal to a headbox controller that is configured to control the headbox.

15. The apparatus of claim 14, wherein the processing unit is configured to output multiple control signals to control multiple headboxes associated with manufacture of different layers of the sheet.

16. The apparatus of claim 9, wherein the processing unit is configured to adjust the at least one operating parameter by outputting a control signal to the headbox.

* * * * *